May 29, 1956   F. J. KAEHNI   2,748,356
ELECTRO-CONVECTION COOLING OF TRANSFORMERS AND THE LIKE
Filed July 26, 1951   4 Sheets-Sheet 1

INVENTOR.
Frank J. Kaehni
BY Webb, Mackey, Burden
HIS ATTORNEYS

May 29, 1956 F. J. KAEHNI 2,748,356
ELECTRO-CONVECTION COOLING OF TRANSFORMERS AND THE LIKE
Filed July 26, 1951 4 Sheets-Sheet 2

INVENTOR.
Frank J. Kaehni
BY
HIS ATTORNEYS

INVENTOR.
Frank J. Kaehni
BY
HIS ATTORNEYS

INVENTOR.
Frank J. Kaehni
BY *Webb, Mackey & Burden*
HIS ATTORNEYS

United States Patent Office 2,748,356
Patented May 29, 1956

2,748,356

ELECTRO-CONVECTION COOLING OF TRANSFORMERS AND THE LIKE

Frank J. Kaehni, Cleveland, Ohio, assignor, by mesne assignments, to The Electric Heat Control Company, Youngstown, Ohio, a corporation of Ohio Application July 26, 1951, Serial No. 238,733

14 Claims. (Cl. 336—58)

The present invention relates to transformers, rectifiers, condensers, generators, motors and other similar electrical apparatus, and more particularly to the cooling of such apparatus by means of electro-convection.

The present application is a continuation-in-part of the application filed jointly by me and William J. Kaehni on July 15, 1947, Serial No. 760,974, for Heat Exchange Method and Apparatus, now Patent No. 2,605,377.

In many types of electrical apparatus, such as transformers, generators, motors, rectifiers, condensers and the like, heating of the equipment during operation is a limiting factor as regards capacity, efficiency of operation and life. As a consequence, various efforts have been made and expedients resorted to for the purpose of limiting the temperature rise in the normal operation of such equipment. However, the expedients which have been employed, some of which will be mentioned hereinafter, have not been effective to adequately overcome material limitations upon the capacity, efficiency and life of such equipment by the rising temperatures caused by the electrical losses in such equipment.

In the case of power transformers, the kva. rating is definitely established by temperature considerations and insulation life. As a consequence, for long life and efficiency of operation, it has been necessary to provide cooling means so that certain limiting temperature conditions are not exceeded. In a given design of transformer, the amount of heat that can be transferred from the windings to the fluid, which is generally oil, is the limiting factor as regards power rating with a given temperature differential. In the larger transformers, wherein the oil in which the core and windings are immersed is used as insulation and to remove the heat from the windings and core, this heat must be removed from the oil by either natural convection and radiation from the casing or by placing cooling coils within the casing and circulating a coolant therethrough or by forced circulation of the fluid from the casing and into and through heat exchangers. In some instances, the oil is circulated through tubes extending externally of the casing. In other instances, separate radiators or other types of heat exchangers are mounted externally of the casing. Either forced air cooling or water cooling is resorted to in order to cool the oil passing through the radiators. In other instances, heat exchangers are positioned externally of the transformer and the oil forced through the heat exchangers and cooled by means of water which also is circulated through the heat exchangers.

Where natural convection and radiation are relied upon, the heat in the windings is given up slowly to the oil in the transformer, which then rises in the housing due to heat. The heated oil accumulates near the top of the oil body and the heated oil flows outwardly to the cooler surface of the casing where it gives up some of its heat. At the cooling surface, due to increased density, the oil moves slowly downward and again enters the zone of the heated windings and core of the transformer to repeat this slow cycle. This action results in the upper coils remaining hotter than the lower ones as the oil which has picked up heat from the lower coils cannot pick up much of the heat from the upper ones.

Some increase in rating can be obtained by employing forced air cooling. Fans may be used to blow air against the casing or, where radiators are used, the forced air may be used in conjunction with these radiators. Also, some increase may be obtained by using water cooled heat exchangers or by means of forced circulation of the oil through the transformer and the heat exchangers. Up to 30 to 50% increases in rating can be obtained in this way, for limited periods of time, over and above the ratings obtainable with natural convection and radiation from the casing. In the transformer itself, the areas of the copper coils and core remain fixed so that the only way of increasing heat removal by the known methods has been to more rapidly circulate the oil. Since oil and other electrical insulating fluids are usually poor conductors of heat, it is difficult to transfer the heat from the windings to the oil and from the oil to air or water at the low temperature differentials which must, of necessity, be employed in the operation of such equipment.

I have found that by the use of electro-convection cooling in transformers in accordance with the present invention, I can materially increase the capacity of the transformer. For example, where my invention is applied in a transformer provided with a water cooled heat exchanger, 20% and higher loadings can be employed continuously without exceeding the recommended temperature rise in the oil and copper established by normal 100% load operation.

The same situation as that just mentioned in respect to transformers prevails in the case of rectifiers, condensers, motors, generators, oil filled cables, and other electrical equipment. The capacity, efficiency and life thereof are dependents upon the extent of the heating which takes place during use and the ability to economically remove this heat. If this heat can be reduced to a minimum, such equipment will perform more efficiently, will have a longer life, and can be operated at higher loads without hot spots, insulation damage and lubrication breakdowns.

Large motors and generators generally are provided with forced ventilating and cooling systems, which are incorporated in their design, by means of which cooled air or gas is rapidly circulated through and around the parts of the machine where heat is generated in order to carry this generated heat away and prevent the equipment from becoming overheated. Radiation cooling has been found to be totally inadequate in such units. Where air cooling is employed, the ambient air is forced through the machine by either internal or external fans or blowers, or by a combination thereof, and, in this way, heat is carried outside of the machine. In cooling with hydrogen, nitrogen or other gases, a closed system is generally employed so that these more expensive cooling mediums are not wasted. These gases are circulated through heat exchangers for cooling and used repeatedly. In such cases, it is necessary to have the entire machine and the heat exchangers form a hermetically sealed system. Whatever the cooling medium is, it must carry away the heat from the copper windings of the stator and the rotor, and from the magnetic core materials.

A similar situation exists in respect of large turbogenerators. The rotors are generally provided with passages in the form of axial slots or radial ducts for providing for the circulation of air or some other cooling gas. Both radial and axial ducts are also provided in the stator and the housing for this purpose. Fairly rapid circulation of air or gas must take place in equipment of this character in order to remove the heat generated as a result of the iron and copper losses in the machine.

I have found that, by the application of my electro-convection cooling to such equipment, a material increase can be effected in the amount of heat removable and that, as a consequence, the efficiency, rating and life of such equipment can be increased.

In accordance with my invention, I apply a high potential unidirectional current between two adjacent surfaces in the locale where the heat is generated, or at a point at which the generated heat is accessible, for the purpose of creating convection currents which will speed up the rate of heat transfer and increase the total heat transfer for any given period of time. The heated member or surface can be made one of the electrodes and the cooling surface or members, the other. Alternatively, the heated member or surface can be one electrode and a separate electrode can be positioned adjacent thereto and adjacent the cooling surface. A still further alternative is to have the cooling surface or members one electrode and to position the other electrode adjacent thereto and in close proximity to the surface or member from which the heat is to be extracted.

In the accompanying drawings, I have shown, for purposes of illustration only, several embodiments of my invention as applied to the cooling of transformers. In the drawings—

Figure 1:
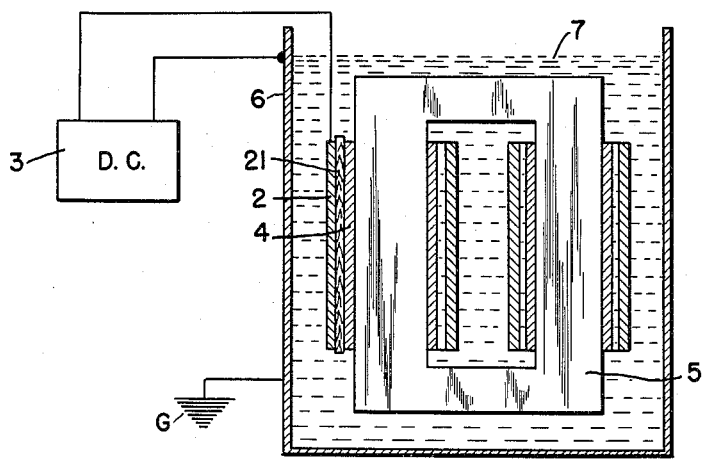
Figure 1 is a diagrammatic view showing my invention as applied to an ordinary core type transformer of the self-cooled type and in which no special electrodes are employed, the casing and windings serving as such.

As is apparent from the drawings, my invention may be applied in various ways to the cooling of transformers. The high potential unidirectional current may be impressed between one of the windings and the casing or between one of the windings and cooling coils, or between one or both of the windings and special electrodes, or between special electrodes and the casing or core or cooling coils. In all of such adaptations, the cooling obtained and the capacity are materially increased, and this is true even though the heated surfaces or elements do not form one of the electrodes for the high potential electrostatic field.

Where the high potential direct current is impressed between one of the windings of the transformer and suitably placed insulated electrodes in the oil, the oil is given a rapid back and forth motion between the heat generating members or surfaces and the cooling members or surfaces, and this serves to remove the heat more rapidly than is possible with natural or forced convection of the oil or any of the other presently known methods for cooling the oil. In the ordinary transformer, the cooler oil near the bottom comes into contact with the windings and moves vertically upwardly along the windings. Since the oil picks up heat as it flows upwardly, it becomes heated to such an extent before reaching the top that the cooling effect in the upper portion is relatively small. Where my invention is employed, it is possible to obtain a motion which is more nearly horizontal than vertical between the heated windings and the charged electrodes and also between the charged electrodes and the cooling surface. A like action occurs between the oppositely charged surfaces or elements where no separate electrodes are employed. The distance of travel may be made quite short so that a rapid heat transfer will be obtained.

It is desirable, in applying my invention to transformers and to other equipment as well, to reduce the spacing between the oppositely charged surfaces to comparatively short distances so that the oil will have to travel only a short distance horizontally from the hot windings to the cooling surfaces. In this way, excessive heating of the upper sections of the windings, as compared with the lower sections, will be diminished because the heat travels substantially horizontally and with great rapidity to the cooling surfaces rather than cumulatively and slowly upwardly along the vertical line of heated surfaces of the windings. As indicated, the cooling coils or cooling surfaces themselves, or the transformer windings, may serve as the insulated electrodes which are maintained at a difference in direct current potential. If the cooling coils have sharp edges on them, they will speed up the motion of the electrostatically charged oil away from them and still further improved results will be obtained. If the copper windings or the cooling coils employed are smooth and rounded, then, if separate electrodes are employed, it is desirable to have the edges relatively thin because a more rapid movement of the oil can be obtained since the sharper edges or surfaces give a higher degree of directionality to the electrostatic field between the electrodes and the adjacent surfaces. The action obtained is proportional to the potential gradient.

If alternating current potentials are present between the windings and the case of the transformer, which is generally the case, the high direct current electrostatic potentials utilized in carrying out my invention are superimposed thereon.

In tests which have been conducted on a 10 kva. transformer, in which the spacing from the electrodes to the nearest section of the winding was approximately one-half inch, and the spacing from the electrodes to the water cooled coils was about the same, a 20 kilovolt direct current potential for producing the desired electro-convection resulted in maintaining the oil temperature at a relatively low value with a load of 25 kva.; whereas, this transformer, under normal operating conditions had a rating of no more than 12.5 kva. with a somewhat higher oil temperature. Thus the capacity of this transformer was increased 100% and the temperature of the oil maintained appreciably below the permissible temperature.

I have found that where the high potential direct current is impressed on the apparatus in the manner described, the oil in contact with the electrostatically charged electrode is not only repelled rapidly from the electrode, but is also attracted to any surface of opposite electrostatic polarity in its vicinity and comes into intimate contact with the surface in order to give up its electrostatic charge and heat to the cooling medium. It becomes neutralized and acquires a charge of opposite polarity and is again attracted and returns to the original electrode with which it was in contact. This cycle is rapidly repeated and there is a rapid transfer of the heat from the hotter surface to the cooler surface.

The extent and effectiveness of this motion is dependent upon the voltage of the electrostatic field, the spacing of the electrodes (which may be the windings, the casing, the cooling tubes, the core or special electrodes), the shape of the electrodes and the viscosity of the oil. One of the limiting factors in regard to the voltage of the electrostatic field is the insulation breakdown of the oil. The high voltage power supply should have such characteristics of regulation that little energy is dissipated when and if breakdown occurs. This is a safeguard against ignition of the oil. Of course, very little energy is necessary for this electrostatic field since the convection action can be obtained with extremely low current values. Good results have been obtained with potentials on the order of one-tenth to one-half of the spark-over or breakdown potential, thus assuring a large factor of safety against sparking. Current consumption is of the order of 50 microamps for the 25 kva. transformer mentioned above. As a general rule, if the spacings between the electrodes and the hot and cold surfaces are small, low voltages will give satisfactory results. For larger spacings, higher voltages are necessary for most efficient heat transfer. I have found that 15,000 volts D. C. potential will produce rapid motion in a body of oil and efficient heat equalization if pointed or small curvature or flat electrodes are spaced about an inch or less from larger curved or flat surfaces of opposite polarity.

In extremely large transformers where heat is an extremely serious problem and it is difficult to get contact between the oil and a sufficiently large area of the windings and core, various expedients in transformer design may be resorted to for the purpose of bringing more of the oil into contact with the core and windings. For example, horizontal oil ducts may be employed between sectional windings. Also, vertical intercommunicating ducts may be employed on the inside between the core and the coils and between the coils and the housing or cooling surfaces. My invention may be applied to such transformers in the manner described above and shown in the drawings and improved results obtained, but, in addition thereto, other expedients may be employed in order to speed the movement of the oil adjacent all parts of the core and windings. For example, additional electrodes with or without sharp edges can be positioned in alternate oil ducts in order to speed up the heat transfer.

In any installation, it is desirable to have as much as possible of the area of the windings exposed to the oil or other fluid, for this gives greater areas on which the electrostatic field may act to provide greater circulation of the fluid.

One reason why I have obtained a transfer of heat several times faster at the same temperature differential and over the same area where the electrostatic field was used, is that there is an immediate transfer of heat from the warmed surface to the liquid upon the application of the high potential direct current. Where such potential is not employed, there is a limited transfer of the heat to the cooler surface until the liquid has become heated to such an extent that it will expand and become lighter and move upwardly in the transformer. Due to the electrostatic forces of repulsion and attraction between the surfaces and the oil particles, when subjected to a direct current potential gradient or field, the oil moves immediately whether it is warmer, colder, or at the same temperature.

In the embodiment shown in Figure 1, my invention is applied to an ordinary core type transformer of the self-cooled type and in which no special electrodes are employed. In this embodiment, the high voltage windings 2 are connected to the source of the high potential direct current 3. Both the high voltage windings 2 and the low voltage windings 4, of course, are positioned around legs of the core 5 and are spaced apart by a plurality of wood, or the like, strips 21 spaced around coils. The one side of the electrostatic field is connected to the casing 6, which is spaced from the windings, the space containing oil 7, or some other dielectric fluid. The casing may be grounded, as indicated at G. In operation, a suitable high potential is supplied in the manner just described and an electrostatic field created between the casing and the high voltage windings. This field causes a rapid back and forth motion of the oil particles between the heat generating surfaces, i. e., the windings and the cooler surface, i. e., the casing, with the result that heat is removed from the windings and the core much more rapidly than is possible with natural or forced convection of the oil. The particles of oil move in a short direct path, more nearly horizontal than vertical, between the heated windings and the casing so as to bring about this cooling.

It is desirable to have the spacing between the hot and cold surfaces, i. e., the windings and the casing respectively, as small as possible so that the distance of travel of the charged particles will be maintained at a minimum. I have found that a spacing of one inch or less is desirable in order to permit the use of lower potentials. I have found that where the spacing is approximately one-half inch, a direct current potential for producing the electro-convection of 20,000 volts gives desirable results.

Figure 2:
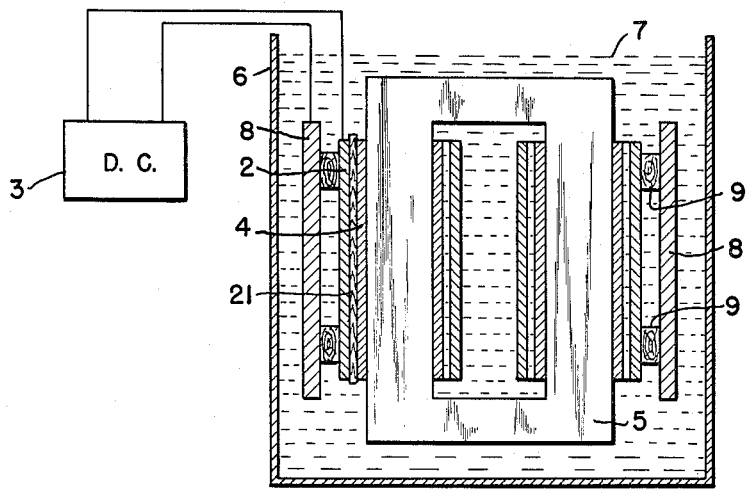
Figure 2 is a diagrammatic view of an ordinary core type transformer of the self-cooled type and embodying special electrodes for the application of my invention.

In Figure 2, I have shown digrammatically a conventional core type transformer of the self-cooled type to which suitable special electrodes have been applied. In this embodiment, as in the embodiment shown in Figure 1, one side of the high potential direct current source 3 is connected to and superimposed on the high voltage winding of the transformer. The other side of the high potential direct current is connected to each of a plurality of electrodes 8 positioned around the core and windings between the windings and the casing. Any desired number of such electrodes 8 may be employed. These electrodes may be mounted in any suitable manner but, as shown in Figure 2, they are supported on insulated blocks 9, which are in turn secured to the windings. These electrodes 8 are preferably spaced approximately an equal distance between the windings and the casing, although, of course, this is not essential.

In this embodiment, the electrostatic field is created between the electrodes 8 and the high voltage windings and the oil particles are charged and will move between the electrode and the high voltage winding and materially speed up the rate of heat transfer from the windings to the oil and from the oil to the surrounding casing.

Figure 3:
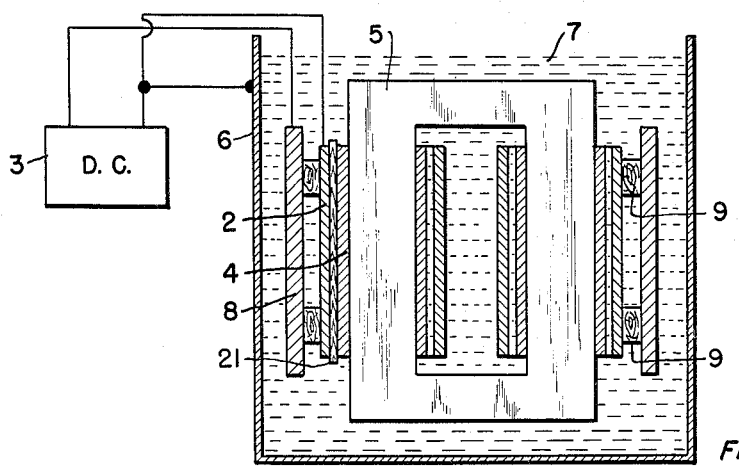
Figure 3 is a view similar to Figure 2 except that different connections are shown.

The embodiment shown in Figure 3 is substantially the same as that shown in Figure 2 except that the high voltage winding is connected to the other side of the high potential direct current source 3. The casing is also connected to the same side thereof. The electrodes 8 are connected to the other side of the high potential direct current source.

Figure 4:
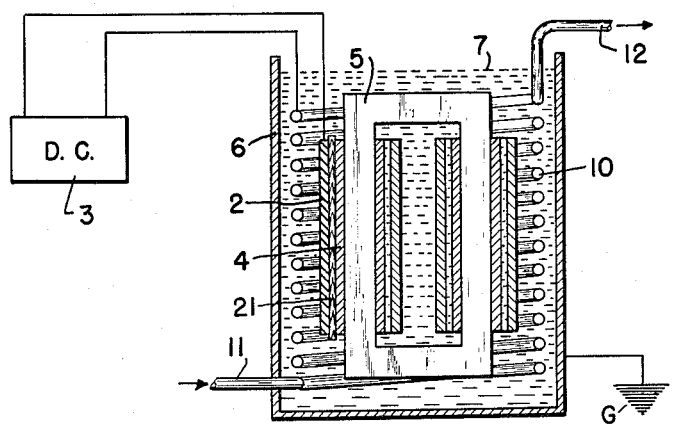
Figure 4 is a diagrammatic view showing my invention applied to a transformer provided with internal cooling coils and without special electrodes.

In Figure 4, I have shown an ordinary core type transformer provided with internal cooling coils and without any special electrodes. As shown, the high voltage winding 2 is connected to one side of the high potential direct current source 3. The cooling coils 10 through which water or some other suitable fluid is circulated for removing heat from the oil are connected to the other side of the high potential direct current source. The coils are connected to an inlet 11 and an outlet 12. The electrostatic field created by the high potential direct current source provides the electro-convection discussed above and improves the cooling rate to such an extent that the transformer may be loaded to 200 or 300% of its normal rated capacity. The charged particles of oil move back and forth horizontally between the windings and the cooling coils and give up their heat to the cooling coils rapidly and then are repelled toward the high voltage winding where they again pick up heat and transfer it to the cooling coils. While, as shown, the high voltage winding is connected to the positive side of the high potential direct current source, entirely satisfactory results are obtained by connecting the cooling coils 10 to the positive side of the high potential direct current source and the negative to the windings.

Figure 5:
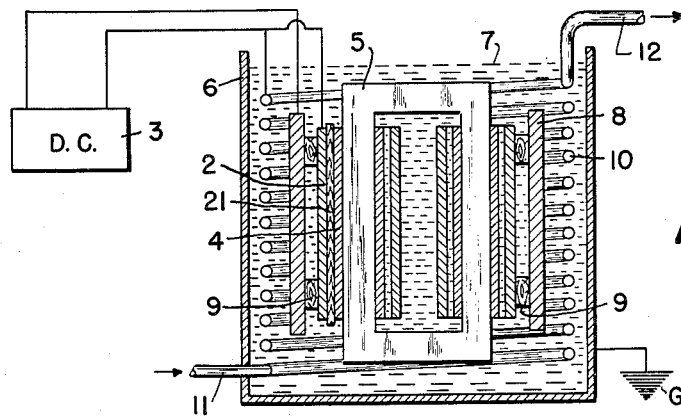
Figure 5 is a diagrammatic view showing my invention applied to a transformer having internal cooling coils and separate electrodes.

In Figure 5, I have shown a core type transformer having internal cooling coils and separate electrodes. In this embodiment, the cooling coils 10 extend completely around the interior of the casing between the casing and the windings and core. The electrodes 8 are preferably positioned approximately midway between the cooling coils and the windings of the transformer, although this is obviously not essential since any suitable spacing may be used. Any suitable number of electrodes can be provided. As shown, the electrodes are connected to one side of the high potential direct current source 3 and the cooling coils 10 and the transformer windings 2 are connected to ground or to the other side. The casing 4 also may be grounded. In this embodiment, as in the others described, by impressing on the apparatus a high potential direct current electrostatic field, the particles of the oil are charged and moved back and forth between the oppositely charged surfaces and cause the particles of oil 7 to pick up heat from the heated windings and to carry it to the cooler surfaces where they are repelled and caused to go back and come in contact with the heated surface of the winding again and they are there repelled toward the cooler surfaces. The spacing between the electrodes 8 and the cooling coils 10 and the windings from which heat is to be extracted is preferably kept to a minimum. I have obtained excellent results with relatively low potentials with a spacing of three-eighths of an inch between the electrodes and the windings and between the electrodes and the cooling coils or tubes.

Figure 6:
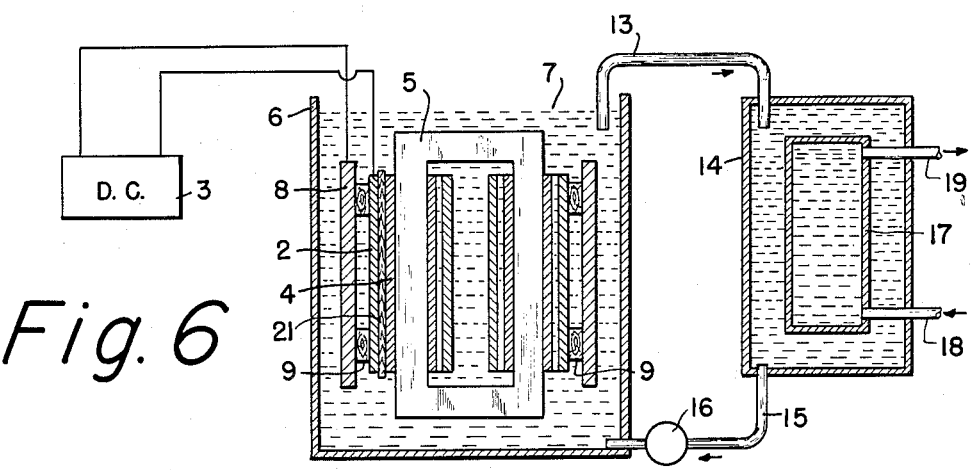
Figure 6 is a diagrammatic view showing my invention applied to a transformer having special electrodes and external cooling means.

As indicated, my invention may be applied to transformers embodying external heat exchangers. In Figure 6, I have shown a diagrammatic view of a core type transformer provided with an external heat exchanger. In this embodiment, the electrodes 8 are connected to one side of the high potential direct current source 3. The high voltage windings 2 are connected to the other side of the high potential direct current source 3. The oil 7 picks up the heat from the windings and core and is circulated through an outlet pipe 13 to a heat exchanger 14 and through an inlet pipe 15 and returned to the main body of oil in the transformer. In view of the fact that some natural convection takes place and the warmer oil moves to the upper part of the transformer, the oil is taken off from the upper portion of the tank and, after passing through the heat exchangers, returned near the bottom thereof. As it passes through the heat exchangers, heat is extracted from the oil by cooling water which is also circulated through the heat exchanger in any suitable manner. A pump 16 may be used for this purpose. In this embodiment, due to the application of the electrostatic field between the electrodes and the windings, the particles of oil rapidly extract the heat from the windings and the oil is then circulated through the heat exchangers and cooled and returned to the tank.

Figure 7:
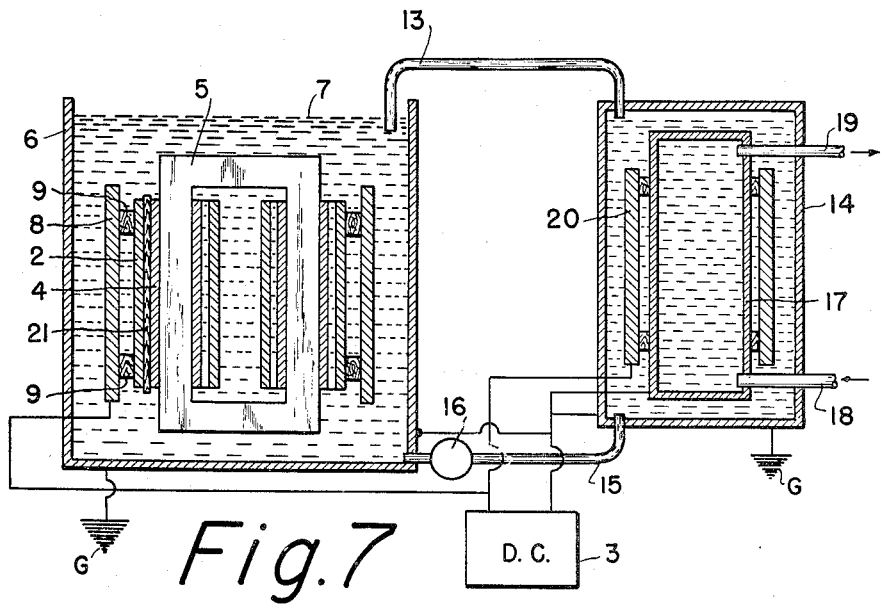
Figure 7 is a diagrammatic view showing my invention applied to a transformer provided with external heat exchangers and in which the oil is forced through a heat exchanger where heat is extracted by means of water, special electrodes being utilized internally of the transformer and in the heat exchanger for application of the electrostatic field.

In the embodiment shown in Figure 7, the oil or other fluid in the transformer is passed through a heat exchanger. It is discharged from the transformer through the outlet 13, which is positioned so as to take oil from the upper part of the transformer and is returned to the lower portion of the transformer through the inlet 15. A pump 16 is used for providing the necessary circulation. The oil is circulated through the heat exchanger 14 where it is passed over a cooler 17 through which water or some other coolant is passed. The water enters the cooler 17 through an inlet 18 and is discharged therefrom through the outlet 19. Electrodes 20 are positioned between the cooler 17 and the outer wall of the heat exchanger and these electrodes are connected together and are connected to one side of the source of high potential direct current. The casing of the heat exchanger and also the casing of the cooler are connected to ground or to the other side of the source of high potential direct current, and, as a consequence, the oil, during its passage through the heat exchanger, is subjected to the action of the electrostatic field. The action which takes place here is, of course, like that which takes place in the transformer.

The source of high potential direct current is similarly connected to the electrodes 8 in the transformer and also to the casing of the transformer. In both the heat exchanger and the transformer of the embodiment shown in Figure 7, the individual electrodes are connected together internally of the heat exchanger or the transformer and a single lead taken off and connected to the current source. This is also true in regard to the other embodiments described heretofore, in which special electrodes are employed.

Figure 8:
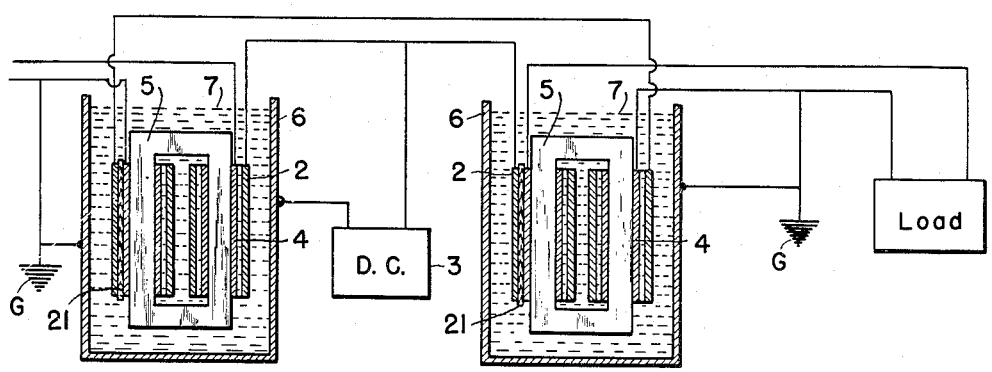
Figure 8 is a diagrammatic view showing my invention as applied to a system employing both step-up and step-down transformers.

In Figure 8, I have shown a further embodiment of the invention. In this figure, I have illustrated how the invention may be applied to a system embodying both step-up and step-down transformers. As is shown, the source of high potential direct current may be connected to the high voltage winding of one transformer and to the transformer casing, which is also grounded, and this single source will then suffice to apply the high potential to both of the transformers and to any others which may be connected into the line.

Figure 9:
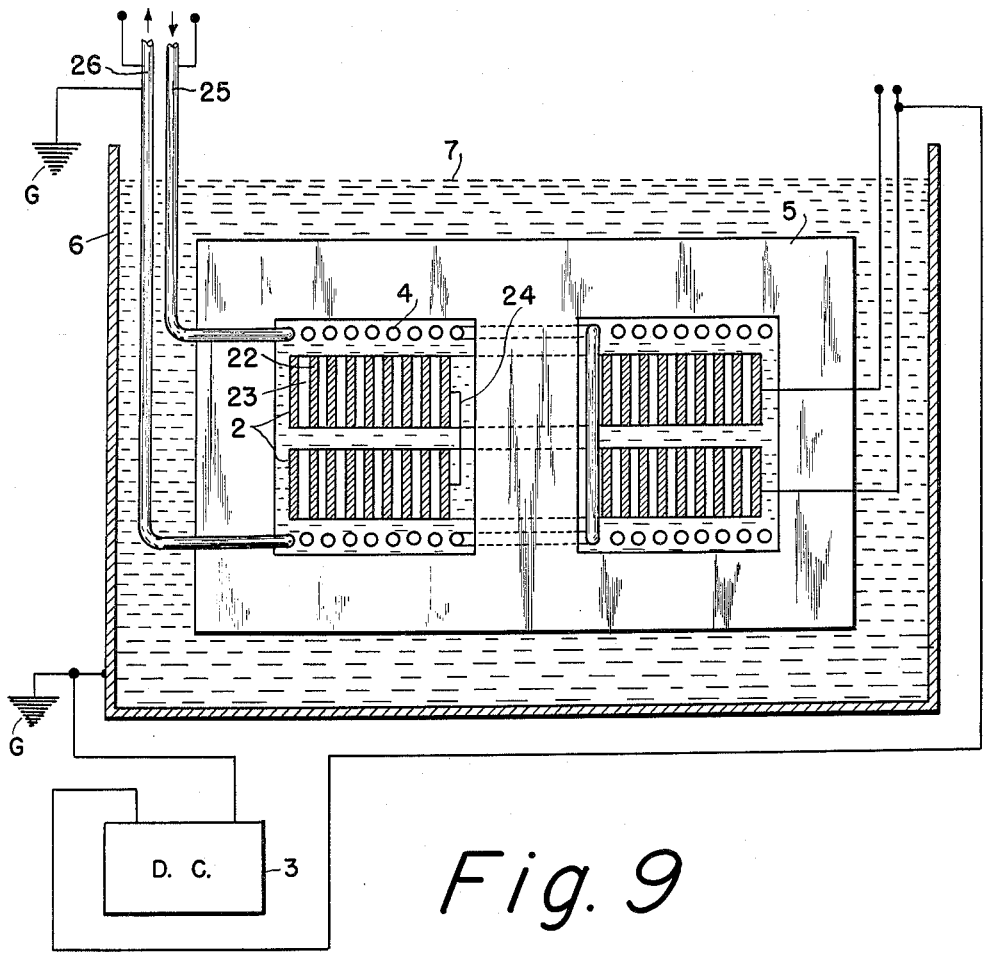
Figure 9 is a diagrammatic view showing my invention embodied in a special shell type transformer.

In Figure 9, I have shown my invention applied to a shell type transformer of novel design. In this embodiment, the high voltage winding 2 is formed of bare copper ribbons 22 of flat wire, the turns being spaced from each other by insulation 23. As shown, there are two such coils of flat wire which are connected together by a jumper 24. These windings extend around the central leg of the core 5. The low voltage winding 4 consists of coiled tubing located adjacent the primary winding but suitably insulated therefrom. Water, or some other suitable fluid for cooling purposes, may be circulated through the low voltage winding, passing in the inlet end 25 and out through the outlet 26. The high voltage winding is connected to one side of the source of high potential unidirectional current and the other side of the source connected to ground or to the low voltage winding. If connected to ground, the low voltage winding will also be grounded. Also the casing may be grounded. With this arrangement, the electrostatic field is created between the high voltage winding on the one hand and the casing and low voltage winding on the other hand. Due to the fact that an edge of each turn of the high voltage winding is not covered by insulation and is exposed to the cooled low voltage winding and that the field exists between these windings, rapid cooling is obtained. If desired, both the high voltage and the low voltage windings may be of the flat wire type and a coiled cooling tube positioned therebetween, in which event the electrostatic field will be impressed between the windings and the tube.

It will be apparent to those skilled in this art that, if desired, the core of the transformer may be cooled and may be connected to one side of the source of high potential unidirectional current, the other side being connected to the casing, or electrodes, or cooling coils, or the windings.

In any of the embodiments described above, if desired, the electrodes or cooling coils may be located near the bottom of the casing adjacent the core and windings. In this event, the flow of particles of heated oil will be vertically, the heated particles moving downwardly in a direction opposite the normal convection flow caused by the heating of the oil. Also, if desired, the electrodes or cooling coils may be located adjacent the top of the casing; in which event, the natural convection is materially speeded up with the result that the transformer is materially cooled. The electrodes may be positioned in any suitable way and, in fact, both top and bottom electrodes or cooling coils may be used with or without electrodes around the sides of the casing.

I have found that with any of these embodiments, it is possible to materially increase the rate of dissipation of the heat in the transformer and that, as a result, the capacity of the transformer can be increased by at least 150%. By the use of my invention, I have been able to operate transformers at 250% load for extended periods of time without the temperatures in the transformer being as high as they normally would be with only a 100% load.

Figure 10:
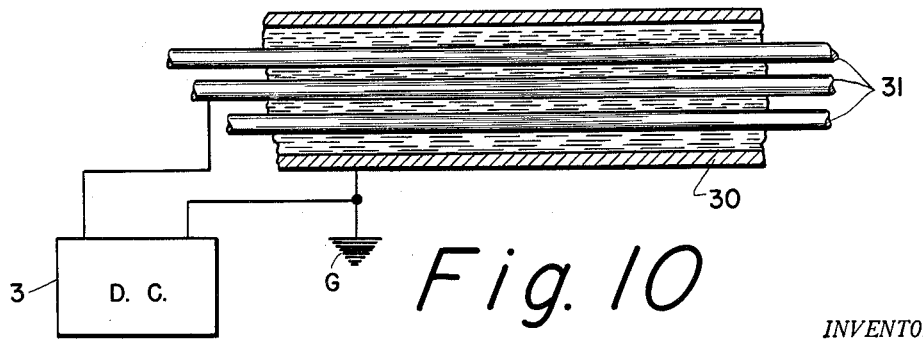
Figure 10 is a diagrammatic view showing the application of this invention to oil filled cables.

In Figure 10, I have shown my invention applied to an oil filled conduit 30 having a plurality of conductors 31 thereon. The conduit 30 is connected to one side of the source of high potential unidirectional current 3. The other side of said source is connected to one of the conductors and an electrostatic field created between the conductor and the casing. This field materially reduces the temperature of the conductors and results in an increase of the load which may be carried by the conductors without undue heating.

While I have shown and described several embodiments of my invention, it must be understood that the invention is not limited thereto and that it may be otherwise embodied and practiced within the scope of the appended claims.

I claim:

1. In apparatus of the character described, the combination of a casing adapted to contain a fluid, an element within the casing and from which heat is to be removed, a fluid in the casing in contact with said element, and means including a source of high potential unidirectional current for subjecting the fluid adjacent said element to a high potential unidirectional electrostatic field.

2. In apparatus of the character described, the combination of a casing adapted to contain a fluid, an element within the casing and from which heat is to be removed, a fluid in the casing in contact with said element, an electrode within said casing adjacent said element, and means including a source of high potential unidirectional current and connections to said element and electrode for subjecting the fluid adjacent the element and electrode to a high potential unidirectional electrostatic field.

3. The combination with a transformer having a core, primary and secondary windings, a casing and a dielectric fluid in the casing and in contact with it and said windings, of a source of high potential unidirectional current and means to connect said source and one of said windings for subjecting the fluid adjacent the windings to a high potential unidirectional electrostatic field.

4. The combination with a transformer having a core, primary and secondary windings, a casing and a dielectric fluid in the casing and in contact with it and said windings, of a source of high potential unidirectional current, an electrode positioned within the fluid in the casing and adjacent the windings, and connections between said current source and said electrode and one of said windings, whereby the fluid adjacent the windings is subjected to the action of a high potential unidirectional electrostatic field.

5. The combination with a transformer having a core, primary and secondary windings, a casing and a dielectric fluid in the casing and in contact with it and said windings, of a source of high potential unidirectional current, an electrode positioned within the fluid in the casing and adjacent the windings, and connections between said current source and said electrode and at least one of said casing and windings, whereby the fluid adjacent the electrode is subjected to the action of a high potential unidirectional electrostatic field.

6. The combination with a transformer having a core, primary and secondary windings, a casing and a dielectric fluid in the casing and in contact with it and said windings, of a source of high potential unidirectional current, cooling means positioned in said fluid in the casing and adjacent said windings, means for circulating a coolant through said cooling means, and connections between said current source and at least two parts of the group consisting of the casing, cooling means and windings, whereby the fluid adjacent the windings is subjected to the action of a high potential unidirectional electrostatic field.

7. The combination with a transformer having a core, primary and secondary windings, a casing and a dielectric fluid in the casing and in contact with it and said windings, of a source of high potential unidirectional current, cooling means positioned in said fluid in the casing and adjacent said windings, at least one electrode positioned within the fluid in the casing and adjacent the windings, means for circulating a coolant through said cooling means, and connections between said current source and at least two parts of the group consisting of the casing, cooling means, windings and electrode, whereby the fluid adjacent the windings is subjected to the action of a high potential unidirectional electrostatic field.

8. The combination with a transformer having a core, primary and secondary windings, a casing and a dielectric fluid in the casing and in contact with it and said windings, of a source of high potential unidirectional current, a heat exchanger positioned externally of said casing, connections between the heat exchanger and the casing for passing fluid from said casing through said heat exchanger and for returning it to the casing, and means to connect said current source and said transformer arranged to subject the fluid while in the casing thereof to the action of a high potential unidirectional electrostatic field.

9. The combination with a transformer having a core, primary and secondary windings, a casing and a dielectric fluid in the casing and in contact with it and said windings, of a source of high potential unidirectional current, a heat exchanger positioned externally of said casing, connections between the heat exchanger and the casing for passing fluid from said casing through said heat exchanger and for returning it to the casing, and means to connect said current source and the transformer and said current source and the heat exchanger arranged to subject the fluid while in the casing of the transformer and while in the heat exchanger to the action of a high potential unidirectional electrostatic field.

10. In a transformer having a core, windings on said core, a casing and a dielectric fluid in the casing and in contact with said windings, a plurality of electrodes mounted in the casing adjacent the windings, a source of high potential unidirectional current, and means to connect said electrodes and said current source for subjecting the fluid in the casing adjacent the electrodes and windings to the action of a high potential unidirectional electrostatic field.

11. In a transformer having a core, windings on said core, a casing and a dielectric fluid in the casing and in contact with said windings, a plurality of electrodes mounted in the casing adjacent the windings, a source of high potential unidirectional current, and means to connect said electrodes and said current source for subjecting the fluid in the casing adjacent the electrodes and windings to the action of a high potential unidirectional electrostatic field, said electrodes being supported by but electrically insulated from said windings.

12. In apparatus of the character described, the combination of a casing adapted to contain a fluid, at least one element within the casing and from which heat is to be removed, a fluid in the casing in contact with said element, at least one electrode positioned within the fluid in the casing, a source of high potential unidirectional current, and connections between said source and said electrode and said element whereby the fluid within the casing is subjected to the action of a high potential unidirectional electrostatic field.

13. In the cooling of electrical apparatus having an element from which heat is to be extracted and a fluid in contact with said element, the step of subjecting the fluid while in contact with said element to a high potential unidirectional current thereby forming an electrostatic field therein with said element as one of the electrodes.

14. In the cooling of electrical apparatus having an element from which heat is to be removed and a dielectric liquid in contact with said element, the steps of subjecting the liquid while in contact with said element to an electrostatic field from a high potential unidirectional source, using said element as one of the electrodes and thereby causing rapid movement of the liquid toward and away from the said element.

References Cited in the file of this patent

UNITED STATES PATENTS

| Number | Name | Date |
|---|---|---|
| 1,020,828 | Jones | Mar. 19, 1912 |
| 1,135,103 | Fortescue | Apr. 13, 1915 |
| 1,351,042 | Jones | Aug. 31, 1920 |
| 1,835,557 | Burke | Dec. 8, 1931 |
| 1,980,521 | Hahn | Nov. 13, 1934 |
| 1,980,821 | Palueff | Nov. 13, 1934 |
| 2,116,509 | Cottrell | May 10, 1938 |
| 2,292,608 | Buckman et al. | Aug. 11, 1942 |
| 2,347,989 | Burnham | May 2, 1944 |
| 2,513,082 | Drefus | June 27, 1950 |

FOREIGN PATENTS

| Number | Country | Date |
|---|---|---|
| 293,108 | Great Britain | June 29, 1928 |
| 506,538 | Germany | Aug. 21, 1930 |
| 866,491 | France | Aug. 14, 1941 |